United States Patent 3,214,453
Patented Oct. 26, 1965

3,214,453
BIS-TRIBUTYLTIN CARBONATE AND A METHOD FOR THE PREPARATION THEREOF
Charles J. Stern, Jr., Westfield, N.J., assignor to Nease Chemical Company, Inc., State College, Pa., a corporation of Pennsylvania
No Drawing. Filed Aug. 25, 1960, Ser. No. 51,798
3 Claims. (Cl. 260—429.7)

This invention relates to novel biocidal compounds and to methods useful in the preparation thereof. More particularly, the present invention relates to novel highly effective fungicidal and bactericidal organo-tin compounds which can be incorporated with advantage into paints and plastic formulations and which can, in addition, be used to treat cloth, leather, and wood to render these materials resistant to fungal and bacterial deterioration; and to methods for preparing the same.

Fungicidal and bactericidal compositions employed heretofore have been known to present one or a plurality of difficulties. Thus, for example, fungicidal and fungistatic chlorinated phenols are normally high toxic, necessitating special handing. In addition, they cause discoloration of plastics and paint films; are corrosive to metals; and are usually ineffective at low treatment levels. Similarly, fungicidal mercapto-dicarboximide compounds when used in clear formulations of coatings and plastics, reduce the heat and light stability thereof and are, in addition, malodorous. In like manner, many copper-containing fungicides result in high treatment costs; discoloration of the paints and plastics in which they are incorporated; are effective over an abbreviated period of time; and involve difficulty in formulation because of poor solubility characteristics. Phenyl mercurials are also employed as viocidal agents and yet are uneconomic, highly toxic, corrosive to metals, and prohibited in certain military specifications for plastic materials.

According, it is an object of the present invention to provide novel thermally stable biocidal organo-tin compounds which are highly effective with and are readily incorporated in a wide range of resins, paints, and plasticizers, as well as cloth, leather, wood and the like; and which in addition, impart heat and light stability to the paints and resins into which they are introduced without altering the color thereof. These organo-tin compounds are, further, noncorrosive to metals and provide economic treatment costs.

The novel biocidal compounds of the invention may be represented by the formulae:

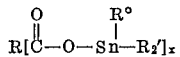

and

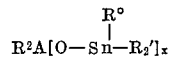

wherein R is a hydrogen atom, a hydrocarbyl radical, or a heterocyclic radical, each of said hydrocarbyl radical and said heterocyclic radical containing within the range of 2 to 20 carbon atoms; $R^0$ is an alkyl radical of 2 to 12 carbon atoms; R' is an alkyl radical of from 1 to 12 carbon atoms; with the sum of $R^0$ and the two R' substituents in each of the above formulae being within the range most desirably of 8 to 14 carbon atoms; $R^2$ is a hydrocarbyl radical containing from 1 to 16 carbon atoms or a halogen or hydrogen atom; A is a benzene nucleus or an additionally substituted benzene nucleus containing from 1 to 4 hydroxy substituents; and x is an integer within the range of 1 to 4 inclusive. The term hydrocarbyl radical as employed herein is intended to envelop monovalent hydrocarbon radicals. The hydrocarbyl substituent represented by each of the R substituents in the above recited formulae can be an alkyl radical containing within the range of 2 to 20 carbon atoms; or an aryl, aralkyl, or alkaryl radical containing from 6 to 20 carbon atoms; or a cycloaliphatic radical of from 3 to 20 carbon atoms. In addition, each of the substituents represented by R may be a heterocyclic radical, as noted above, containing within the range of 3 to 20 carbon atoms. Each of the $R^0$ and R' substituents is most desirably a lower alkyl radical containing from 2 to 8 carbon atoms.

Illustrative of the biocidal compounds embraced by the above formulae are tributyltin nonyl phenoxide, tributyltin benzoate, tributyltin para-tertiary-butyl benzoate, bis-tributyltin phthalate, tributyltin 2-ethylhexanoate, tributyltin isodecanoate, tributyltin-2-ethylhexyl adipate, tributyltin nonyl phenoxide, tributyltin isosebacate, tributyltin oxalate, bis-tributyltin carbonate, tributyltin propionate, tributyltin cresylate and tributyltin myristate.

The term "biocidal" as employed throughout this specification is intended to designate an agent characterized by fungicidal, fungistatic, bactericidal and/or bacteriostatic activity.

The novel compounds prepared as described herein are stable to oxidation by air; are highly resistant to hydrolysis under the usual conditions of manufacture, storage and use. These compounds are characterized, further, by solubility in most organic solvents while being noncorrosive to metals and having a low vapor pressure.

In their pure state, the compounds of the invention are normally colorless liquids or white crystalline or amorphous solids. To facilitate handling as biocidal agents, the solid compounds may be furnished as solutions of the usual organic solvents and plasticizers. Stable water dispersions of these compounds may also be utilized.

The aforesaid compounds are prepared by reaction of a tri-alkyltin oxide with an organic carboxylic acid, the corresponding anhydride thereof, or a phenol. More specifically, the process involves reacting a tri-alkyltin oxide wherein one of the alkyl substituents has the value assigned to $R^0$ and the remaining alkyl substituents have the value assigned to R' in the above recited formulae, with a carboxylic acid of the formula

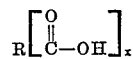

or the corresponding anhydride thereof; wherein each of R and x has the same values assigned them above; or alternatively a phenol of the formula $R^2A'$ wherein $R^2$ has the value ascribed to it above and A' is a phenol containing from 1 to 5 hydroxy groups.

Illustrative of the alkyl stannic oxide components employed as reactants herein are tributyltin oxide, monomethyl-diphenyltin oxide, triethyltin oxide, trioctyltin oxide, trinonyltin oxide, tridodecyltin oxide, tridecyltin oxide, and monoheptyl didecyltin oxide.

Representative carboxylic acid reactants are benzoic acid, butylbenzoic acid, para-tert butyl benzoic acid, phthalic acid, 2-ethylhexanoic acid, isodecanoic acid, 2-ethylhexyl adipic acid, isosebacis acid, oxalic acid, carbonic acid, propionic acid, myristic acid, and propionic acid.

Exemplifying the phenols are nonylphenol, octylphenol, ortho-cresol, meta-cresol, para-cresol and mixtures of ortho-, meta-, and para-cresol. The proportions of reactants are normally determined by the number of carboxyl groups in the acid or anhydride reactant or hydroxy substituent attached directly to carbon atoms of the benzene nucleus. Thus the molar proportions of reactants usually vary within the range of 1:1 to 4:1 of organo-tin component to carboxylic acid or phenol. The reaction takes place within a range from 25° C. up to but, of course, not including the temperature of decomposition of either of the reactants and/or that of the product compound desired; and preferably within the range of 25° C. to 100° C. with the gaseous or more volatile reactants, and from 125° C. to 160° C. with the less volatile reactants.

The activity of the compounds of the invention in controlling fungal and bacterial growth has been determined by the following test procedure. A malt agar solution containing known concentrations (0.1, 0.2, 0.5, 1, 2 and 5 parts per million based on tin content) of the compound tributyltin benzoate was inoculated with the fungus spores and bacteria recited in Table I. The inoculated solutions were incubated for two days at 25° C. and a visual and microscopic examination was made. The concentrations of tributyltin benzoate recited in Table I represent the minimum concentrations causing complete inhibition of growth in each instance.

TABLE I

| Microorganism: | Concentration (p.p.m. tin) of tributyltin benzoate causing complete inhibition of growth of microorganism |
|---|---|
| Bacillus mycoides | 0.1 |
| Bacillus subtilis | 0.5 |
| Micrococcus aureus | 0.5 |
| Bacterium ammoniogenes | 0.5 |
| Miscrosporum audouini | 0.2 |
| Aspergillus niger | 0.2 |
| Aspergillus terrus | 0.2 |
| Aspergillus flavus | 0.2 |
| Penicillium digitatum | 0.2 |
| Penicillium expansum | 0.5 |
| Penicillium funiculocum | 2.0 |
| Penicillium piscarium | 0.5 |
| Pullularia pullulans | 0.2 |
| Trichoderma viride | 0.5 |

In a typical application of the invention, a polyvinyl chloride film formulation was prepared incorporating fungistatic organotin compounds of the present invention as well as known fungistatic compositions employed hitherto. These are recited in Table II together with the concentrations of each employed in a resin formulation constituted as follows:

| | Parts |
|---|---|
| Polyvinyl chloride resin (Geon 101) | 100 |
| Di(2-ethyl hexyl)phthalate plasticizer | 40 |
| Acrawax C | 2 |
| Barium-cadmium stabilizer (Mark WS) | 2 |

It is noted that the term "parts" as employed herein refers to parts by weight unless otherwise explicitly indicated.

TABLE II

| Test No. | Fungistatic Compound | Concentration in Parts per Hundred |
|---|---|---|
| 1 | Tributyltin benzoate | 1.35 |
| 2 | Tributyltin para-tert-benzoate | 1.65 |
| 3 | Tributyltin isodecanoate | 1.60 |
| 4 | Tributyltin 2-ethyl hexyl adipate | 1.90 |
| 5 | Tributyltin isosebacate | 1.35 |
| 6 | Tributyltin nonylphenoxide | 1.50 |
| 7 | 2,2'-Dihydroxy-5,5-dichlorodiphenyl methane | 2.0 |
| 8 | 2,2'-Methylene-3,4,6-trichlorophenol | 2.0 |
| 9 | N-Trichloromethylmercapto-4-cyclohexene-1,2-dicarboximide | 1.5 |
| 10 | Dodecyl dimethyl benzyl ammonium cyclopentane carboxylate salt | 1 |
| 11 | Dodecyl dimethyl benzyl ammonium cyclopentane carboxylate salt | 2 |
| 12 | Phenyl mercuric composition (Corobex CpV, a trade name) | 1 |
| 13 | 2,4-Dichloro-6-(o-chloroanilino)-s-triazine | 1 |
| 14 | Trichlorophenyl acetate | 2 |
| 15 | Trichlorophenyl acetate | 1 |
| 16 | p-Chloro-meta-xylenol derivative (Ottacide P, trade name) | 2 |
| 17 | No fungistat (control sample) | |

The ingredients were thoroughly dry blended and placed on a laboratory roll mill and milled for three minutes at 320° F. The mill gauge was set at 0.040 inch and the material removed from the mill and cooled. Discs, 15 mm. in diameter of polyvinyl chloride film composition, each containing a fungistat of Table II in the concentration recited therein, and a control disc of the aforesaid film and dimensions were placed in an agar medium, seeded with a suspension of spores and fragments of three fungi, Aspergillus niger, Aspergillus flavus and Trichoderma sp. and incubated at 25° C. for a period of fifteen days. The plastic film composition and the adjacent culture medium were examined in each instance approximately every three days for growth and changes in appearance. No growth of the aforesaid fungi was observed on any of the film samples in Tests Nos. 1 to 6 of Table II wherein fungistatic organotin agents of the present invention were employed. Significant growth of the aforesaid fungal cultures occurred however where the remaining fungistatic compounds recited in Table II and utilized in Tests Nos. 7 to 16 thereof were employed.

In addition, the test samples containing the organotin compounds of this invention referred to in Tests Nos. 1 to 6 of Table II were mechanically worked for periods of from 60 minutes to 90 minutes at 300° F. to 350° F. on a laboratory two-roll mill without noticeable discoloration. The test sample of Test No. 9 containing N-trichloromethylmercapto - 4 - cyclohexane - 1,2 - dicarboximide discolored in 21 minutes when subjected to the same procedure. The control sample of Test No. 17 underwent discoloration in 40 minutes under the same conditions of milling.

Light stability tests employing samples identical to those of Test Nos. 1 to 6 above demonstrated that the compounds of the invention remained clear after exposure for 600 hours to ultra-violet light whereas a control sample of the same film composition discolored after 200 hours and evidenced black spots after 800 hours. A film sample containing N-trichloromethyl mercapto-4-cyclohexene-1,2-dicarboximide as constituted in Test No. 9 of Table II was 90 percent darkened after being subjected to the same ultra-violet light for a period of 100 hours and 100 percent black after 200 hours.

Oven stability testing indicated the superiority of the organo-tin compounds in a similar manner.

In addition to plastic resin formulations such as that described above, the biocidal compounds of the invention can be employed in other continuous materials to inhibit growth of microorganisms; thus they can be utilized in water-based paint formulations; oil-based paint and other coating formulations, for example, varnishes, lacquers, shellacs, enamels, marine anti-fouling paints and coatings, and the like; woven and coated fabrics; as well as leather, paper and wood. The compounds of the invention can also be employed in agricultural sprays and dusts for effective pest control. Similarly, they may be included in conventional ointment formulations for control of microorganisms on hides and skin. The amount of active biocidal compound included in any continuous material or in an ointment, spray, or dust as described above is normally within the range of 1 part per million (p.p.m.) to 2 parts per hundred (p.p.h.). Larger concentrations may however be employed if deemed desirable.

The following examples further illustrate the preparation of the organo-tin compounds of the invention:

*Example 1.—Preparation of tributyltin benzoate*

596 grams of bis-tri-n-butyltin oxide (1.0 mole) was added with stirring, over a 15-minute period to 244.24 grams of benzoic acid (2.0 moles) at 125° C. in a two liter, three neck round bottom flask fitted with thermometer, addition funnel, stirrer, Dean and Stark trap and condenser. The temperature of the reaction flask was increased to 160° C. and approximately 18.0 ml. of water (1.0 mole) was collected in the Dean and Stark trap. The condenser and Dean and Stark trap were removed and vacuum (30 mm. Hg) was applied to remove the last traces and volatiles. The product, tributyltin benzoate, a clear colorless liquid upon cooling to room temperature, was obtained in near quantitative yield (822 grams); refractive index 1.4965 at 33½° C.

*Example 2.—Preparation of tributylin-para-tertiary-butyl benzoate*

596 grams of bis-tributyltin oxide (1.0 mole) was added to 356.22 grams of para-tertiary-butyl benzoic acid (2.0 moles) and reacted as in Example 1. 18.0 ml. of water was collected. Upon cooling to room temperature, the product solidified. The product, 934 grams of tributyltin-para-tertiary-butyl benzoate, is a white crystalline solid melting at 53.2° C.

*Example 3.—Preparation of bis-tributyl-tin phthalate*

596 grams of bis-tributyltin oxide (1.0 mole) were added to 148 grams of phthalic anhydride (1.0 mole) at 135° C. with stirring as in Example 1. The temperature was raised to 160° C. and vacuum was applied to remove volatile impurities. The reaction product, bis-(tri-butyltin) phthalate is a clear colorless liquid upon cooling to room temperature; refractive index —$N_d^{25°}$1.522; specific gravity —30/25 1.320.

*Example 4.—Preparation of tributyltin 2-ethylhexanoate*

Following the procedure of Example 1, 596 grams of bis-tributyltin oxide (1.0 mole) were mixed with 288.42 grams of 2 ethylhexanoic acid (2.0 moles), and the temperature raised to 160° C. Vacuum (30 mm. Hg) was applied to remove water (18.0 grams) and volatile impurities. The product, tributyltin-2-ethyl-hexanoate, is a white, waxy solid melting at 42.1° C.

*Example 5.—Preparation of tributyltin isodecanoate*

596 grams of bis-tributyltin oxide (1.0 mole) were reacted with 344.52 grams of isodecanoic acid (2.0 moles). Following the procedure of Example 1, the temperature was raised to 160° C. and vacuum applied to remove water (18.0 grams) and volatile impurities. The product, tributyltin isodecanoate, is a water-white liquid upon cooling to room temperature; refractive index 1.4781 at 33½° C.

*Example 6.—Preparation of tributyltin-2-ethylhexyl adipate*

596 grams of bis-tributyltin oxide (1.0 mole) was mixed with 516.64 grams of the mono-2-ethylhexyl ester of adipic acid (2.0 moles). The temperature was raised to 160° C. with vacuum applied to remove water (1.0 mole). The product, tri-butyltin-2-ethyl hexyl adipate is a white waxy solid melting at 68.0° C. set point.

*Example 7.—Preparation of tributyltin nonylphenoxide*

596 grams of bis-tributyltin oxide (1.0 mole) was mixed with 440.70 grams of nonyl phenol (2.0 moles). The temperature was raised to 160° C. and vacuum applied to remove last trace of water. The product, tributyltin nonylphenoxide, is a clear colorless liquid; refractive index 1.5029 at 33½° C.

*Example 8.—Preparation of tributyltin isosebacate*

596 grams of bis-tributyltin oxide (1.0 mole) was mixed with 202.25 grams of isosebacic acid (1.0 mole). The temperature is raised to 160° C. with vacuum applied to remove water. The product, bis-tributyltin isosebacate, is a white waxy solid melting at 94.5° C.

*Example 9.—Preparation of tributyltin oxalate*

In a similar manner to Example 6, bis-tributyltin oxalate was prepared from molar equivalents of bis-tributyltin oxide and oxalic acid. The product, a white solid melting at 144.9° C., was obtained in near theoretical yield.

*Example 10.—Preparation of bis-tributyltin carbonate*

Carbon dioxide was bubbled through 596 grams of bis-tributyltin oxide at room temperature until 1 mole of carbon dioxide (44.0 grams) was absorbed. The product, bis-tributyltin carbonate, is a colorless liquid, having a refractive index of 1.4970 at 25° C.

*Example 11.—Preparation of tributyltin propionate*

To 13.0 grams (0.1 mole) propionic anhydride were added 59.6 grams (0.1 mole) bis-tribuyltin oxide at 25° C. with stirring. Temperature was raised to 110° C. and vacuum (30 mm. Hg abs.) applied to remove any traces of volatiles. The product was a white crystalline solid melting at 67° C.

*Example 12.—Preparation of tributyltin cresylate*

To 21.6 grams (0.2 mole) of U.S.P. cresol was added 59.6 grams (0.1 mole) bis-tributyltin oxide following the procedure of Example 1. The product, upon cooling to 25° C., was a pale straw colored liquid.

*Example 13.—Preparation of tributyltin myristate*

To 22.9 grams (0.1 mole) of molten myristic acid at 60° C. was added 29.8 grams (0.05 mole) of bis-tributyltin oxide following the procedure of Example 1. Approximately 0.9 gram (0.05 mole) water was removed under vacuum and the product cooled to 25° C. was a clear, viscous liquid.

The compounds so prepared, the reaction products of organotin oxides and carboxylic acids, anhydrides, or phenols, are capable, as noted above, of destroying or inhibiting the growth of a wide spectrum of fungi, bacteria, and similar microorganisms at comparatively low concentrations while neither imparting nor altering the color of the paint, resin or other material into which they are introduced; improving the heat and light stability of resins and paints to which they are added; provide a permanence of treatment due to their low volatility; have excellent weatherability; combine provision against many types of microorganisms, fungi, and the like in a single material; resist extraction from films, e.g., plastic coatings, by water or organic solvents; are compatible with a broad range of resins and plasticizers; and noncorrosive to metals; while being capable of being provided in a form most convenient to ease of handling and low effective treatment cost.

What is claimed is:

1. The chemical compound bis-tributyltin carbonate.
2. A process for the preparation of bis-tributyltin carbonate which comprises reacting bis-tributyltin oxide with carbon dioxide at a temperature of 25° C.
3. A process for the preparation of bis-tributyltin carbonate which comprises reacting bis-tributyltin oxide with carbon dioxide.

References Cited by the Examiner

UNITED STATES PATENTS

| | | | |
|---|---|---|---|
| 2,560,034 | 7/51 | Eberly | 260—429.7 |
| 2,727,917 | 12/55 | Mack et al. | 260—429.7 |
| 2,779,703 | 1/57 | Crouch et al. | 167—22 |
| 2,857,413 | 10/58 | Weinberg | 260—429.9 |
| 2,870,182 | 1/59 | Leistner et al. | 260—429.7 |
| 2,922,738 | 1/60 | McDermott et al. | 167—22 |
| 2,957,785 | 10/60 | Leatherland | 260—429.7 |
| 3,031,483 | 4/62 | Koopsman et al. | 260—429.7 |
| 3,037,040 | 5/62 | Anderson et al. | 260—429.7 |
| 3,095,427 | 6/63 | Kelso | 260—429.7 |

FOREIGN PATENTS 791,119   2/58   Great Britain.

SAMUEL H. BLECH, *Primary Examiner.*

WILLIAM B. KNIGHT, TOBIAS E. LEVOW, A. LOUIS MONACELL, ABRAHAM H. WINKELSTEIN, *Examiners.*